United States Patent
Kitami et al.

(10) Patent No.: US 7,206,406 B2
(45) Date of Patent: Apr. 17, 2007

(54) CALL SYSTEM

(75) Inventors: Hideo Kitami, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 421 days.

(21) Appl. No.: 10/823,739

(22) Filed: Apr. 14, 2004

(65) Prior Publication Data

US 2004/0209656 A1   Oct. 21, 2004

(30) Foreign Application Priority Data

Apr. 16, 2003   (JP)   ............... 2003-111715

(51) Int. Cl.
*H04M 1/00*   (2006.01)
(52) U.S. Cl. ............... 379/419; 455/569.1; 455/575.2; 379/420.1
(58) Field of Classification Search ............ 455/569.1, 455/569.2, 575.2; 379/420.01–420.04, 433.02, 379/433.03, 432
See application file for complete search history.

(56) References Cited

U.S. PATENT DOCUMENTS

| | | | | |
|---|---|---|---|---|
| 5,526,403 A * | 6/1996 | Tam | ............... | 455/426.1 |
| 5,794,163 A * | 8/1998 | Paterson et al. | ............ | 455/575.2 |
| 5,978,689 A * | 11/1999 | Tuoriniemi et al. | ...... | 455/569.1 |
| 6,081,724 A * | 6/2000 | Wilson | ............... | 455/462 |
| 6,097,971 A * | 8/2000 | Hosoi | ............... | 455/570 |
| 6,151,389 A * | 11/2000 | Lai et al. | ............... | 379/156 |
| 6,154,639 A * | 11/2000 | Kanazumi et al. | ............ | 455/74 |
| 6,731,751 B1 * | 5/2004 | Papadopoulos | ............ | 379/399.01 |
| 6,792,295 B1 * | 9/2004 | Hanevich et al. | ........ | 455/569.1 |
| 6,895,260 B2 * | 5/2005 | Lee | ............... | 455/569.1 |
| 6,940,968 B1 * | 9/2005 | Lipton et al. | ............ | 379/388.01 |
| 2002/0049079 A1 * | 4/2002 | Buckley et al. | ............ | 455/568 |
| 2003/0157929 A1 * | 8/2003 | Janssen et al. | ............ | 455/416 |
| 2004/0165733 A1 * | 8/2004 | Pfaffinger | ............ | 381/86 |
| 2005/0009576 A1 * | 1/2005 | Van Bosch | ............ | 455/569.2 |
| 2005/0100141 A1 * | 5/2005 | Otagaki et al. | ............ | 379/88.01 |

FOREIGN PATENT DOCUMENTS

| | | |
|---|---|---|
| JP | 09-224081 A | 8/1997 |
| JP | 2002-094396 A | 3/2002 |
| JP | 2002-345042 A | 11/2002 |
| JP | 2002-368852 A | 12/2002 |
| WO | WO 99/43685 A1 | 9/1999 |
| WO | WO 00/45570 A1 | 8/2000 |

* cited by examiner

*Primary Examiner*—Simon Nguyen
(74) *Attorney, Agent, or Firm*—Sughrue Mion, PLLC

(57) ABSTRACT

This invention enables freely changing over a handsfree call and a handset call using an information terminal. A call system of this invention includes: a handsfree call microphone and a handsfree call loudspeaker; a first sound device that inputs and outputs a sound to the handsfree call microphone and the handsfree call loudspeaker, and that is included in an information terminal; a handset call microphone and a handset call loudspeaker; a second sound device that inputs and outputs the sound to the handset call microphone and the handset call loudspeaker; a handset connected to the information terminal; and a selection unit for selecting, as each of connection destinations on a transmitting end and a receiving end of a telephone line, at least one of the first sound device and the second device in accordance with a call state and an event, so as to set at least one of the handsfree call microphone and the handset call microphone as an input destination of the sound, and to set at least one of the handsfree call loudspeaker and the handset call loudspeaker as an output destination of the sound.

21 Claims, 17 Drawing Sheets

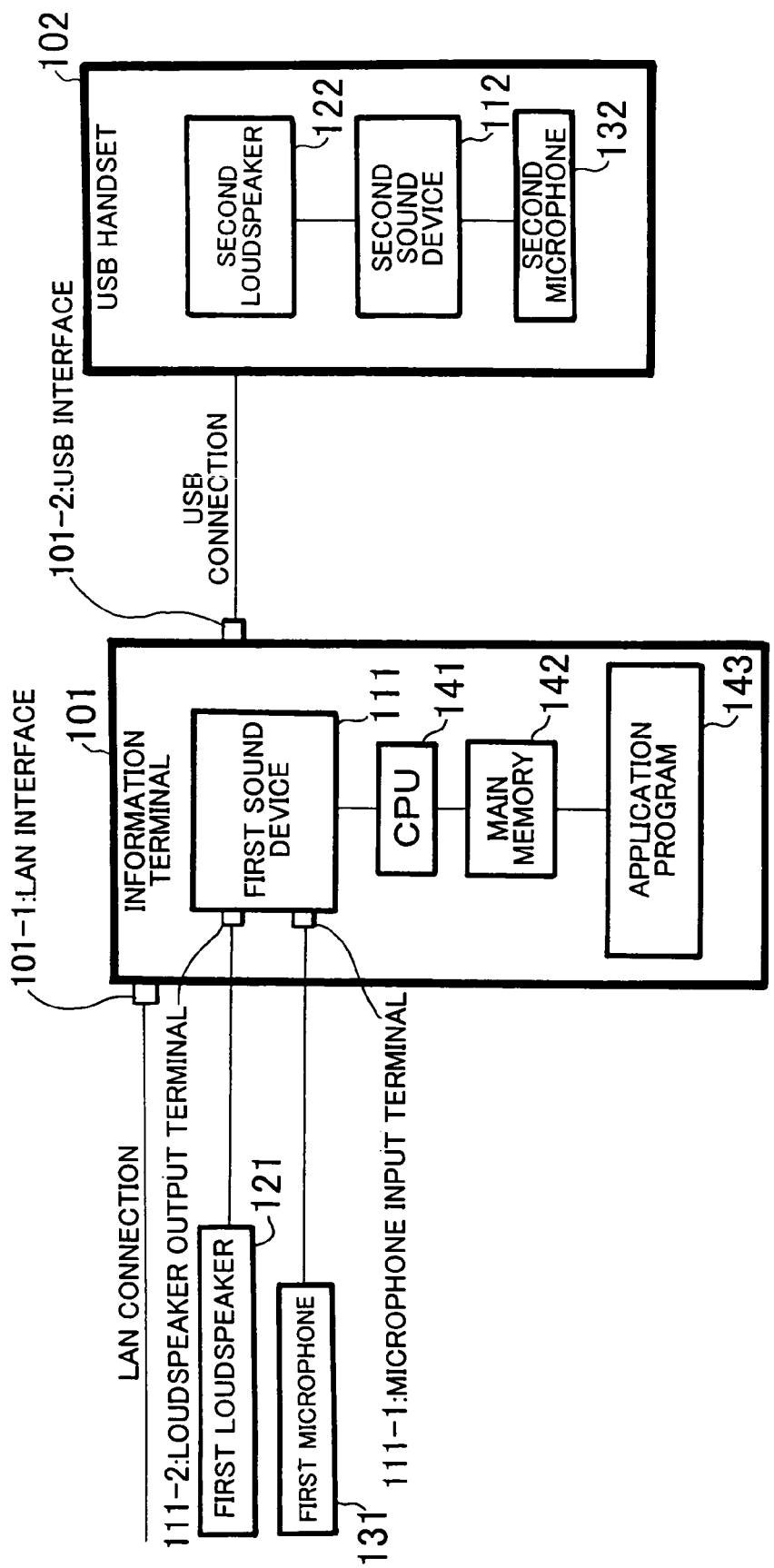

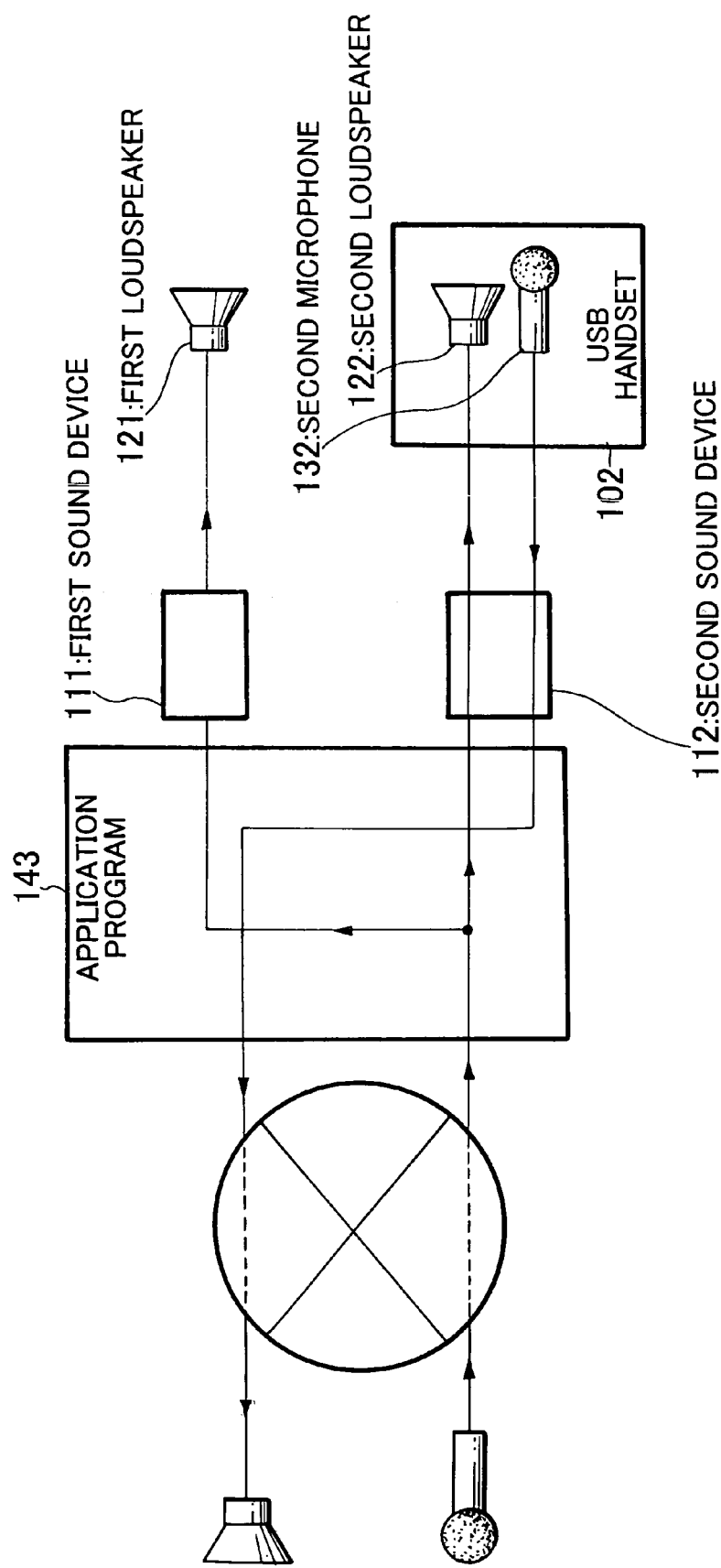

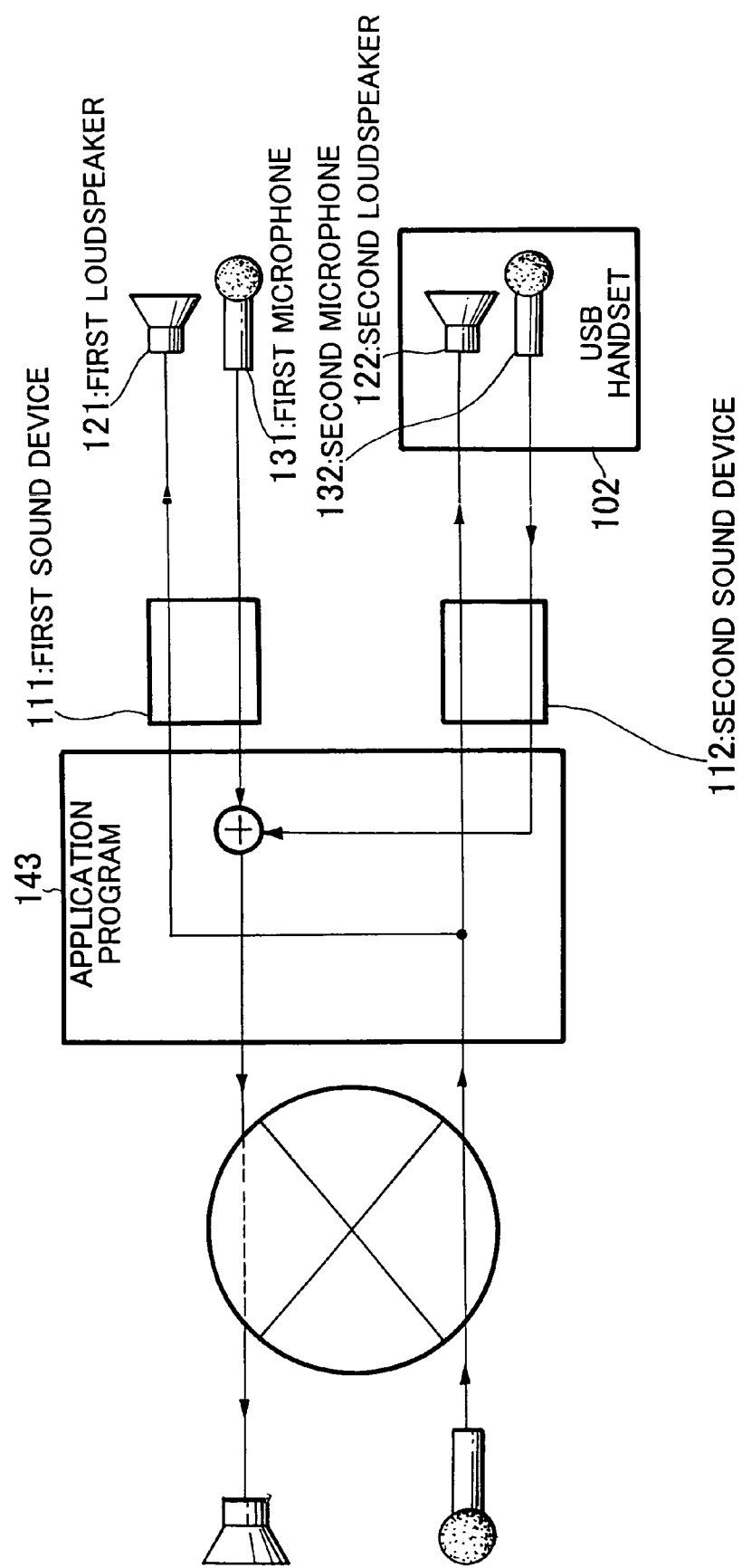

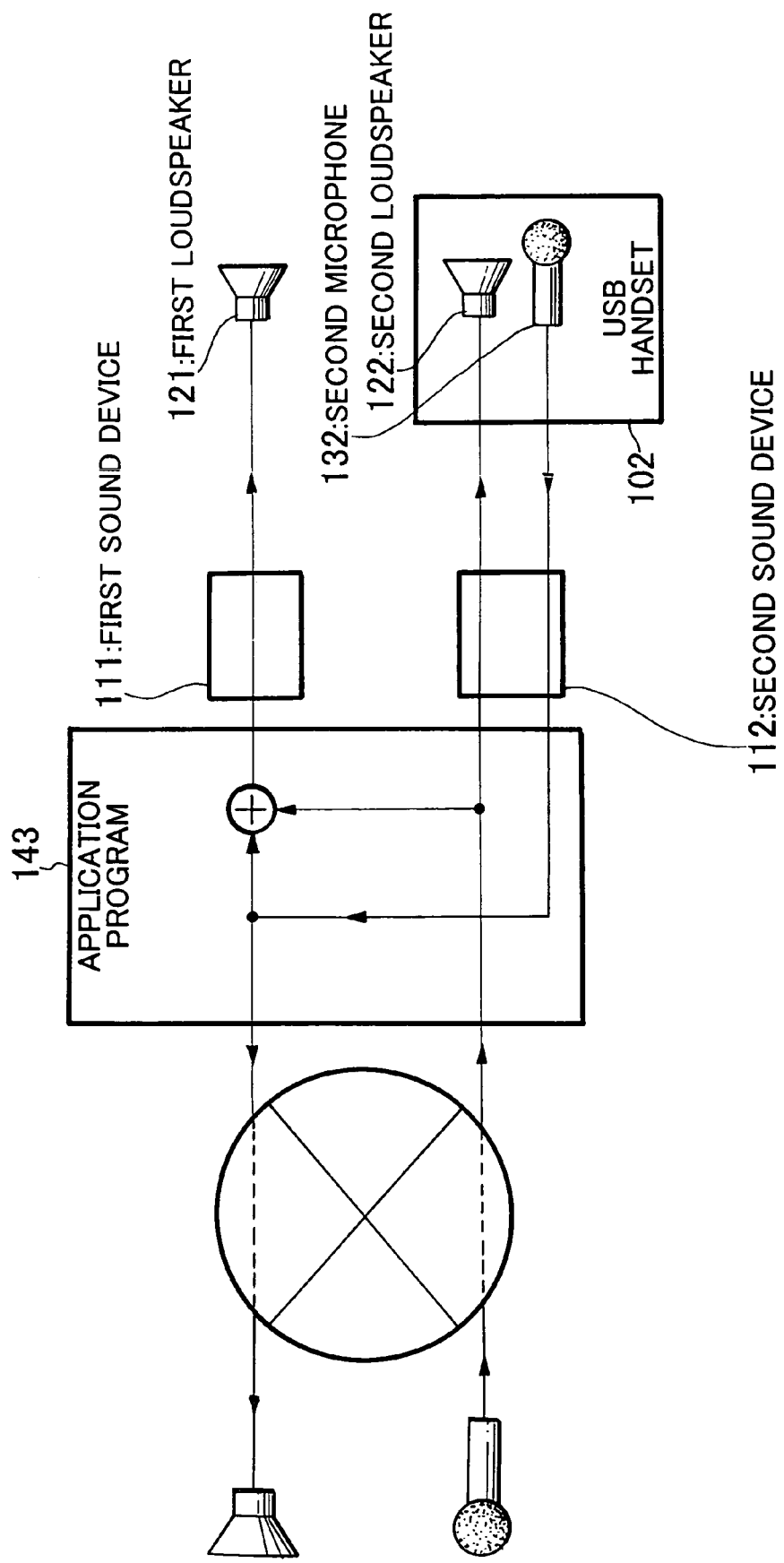

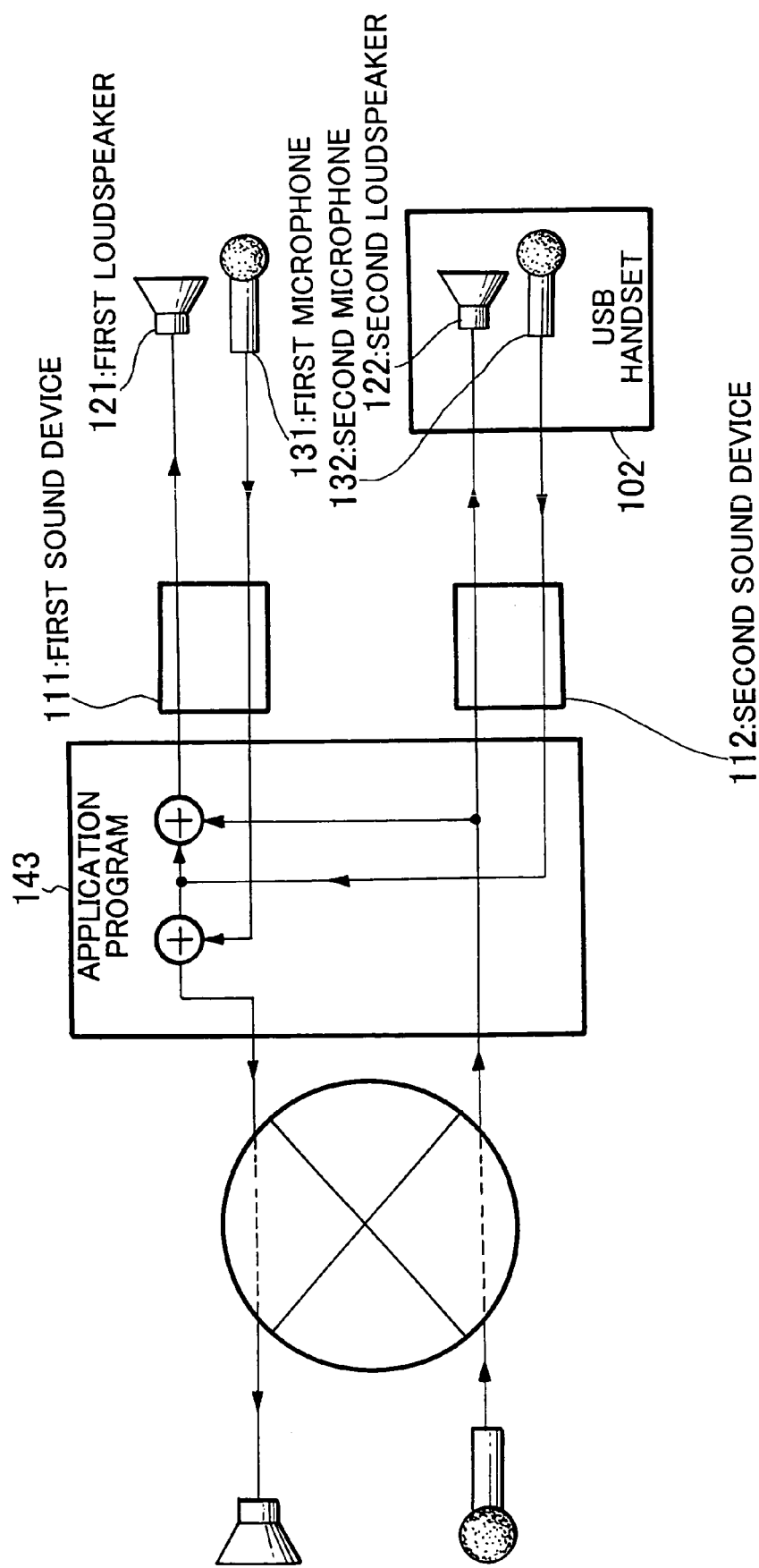

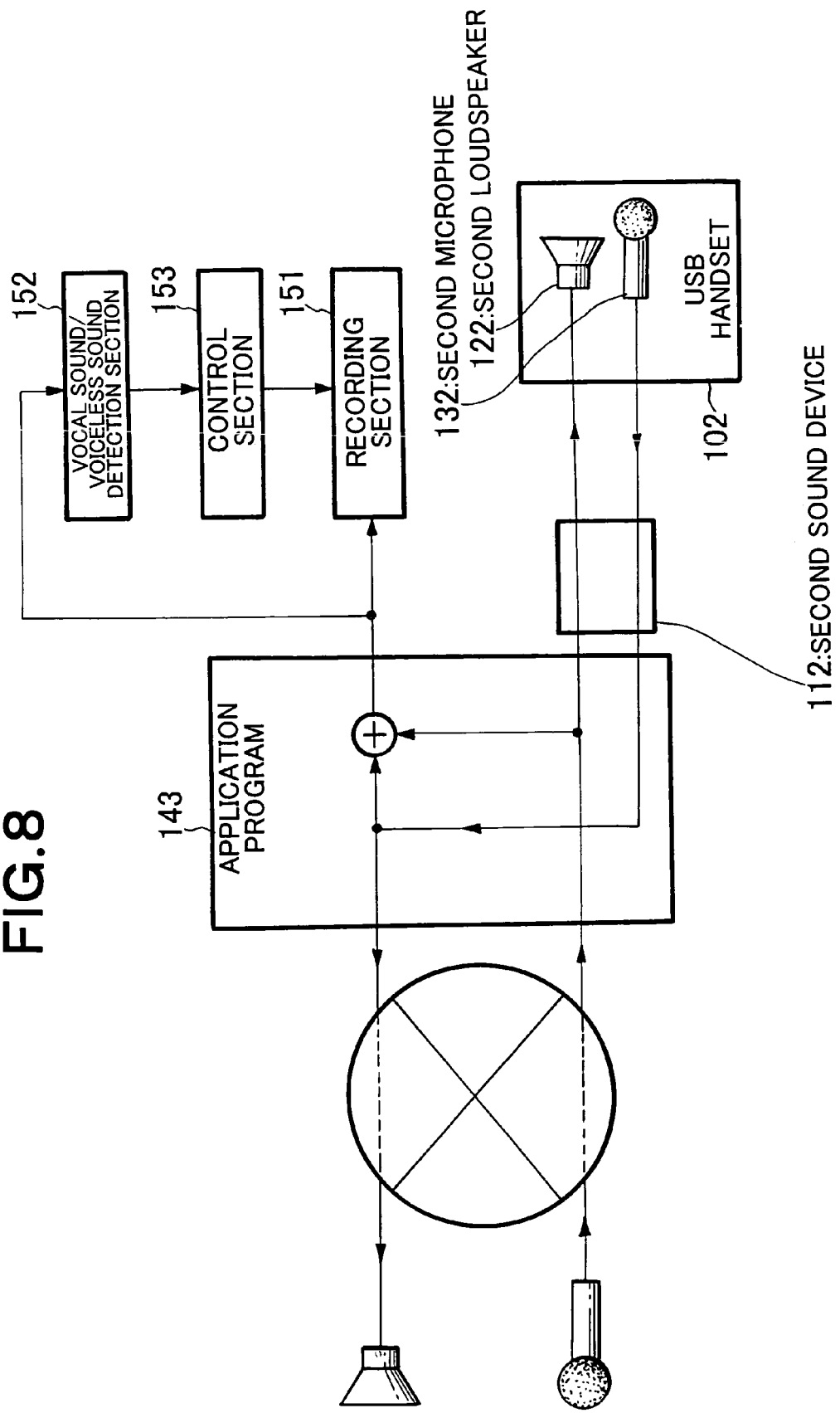

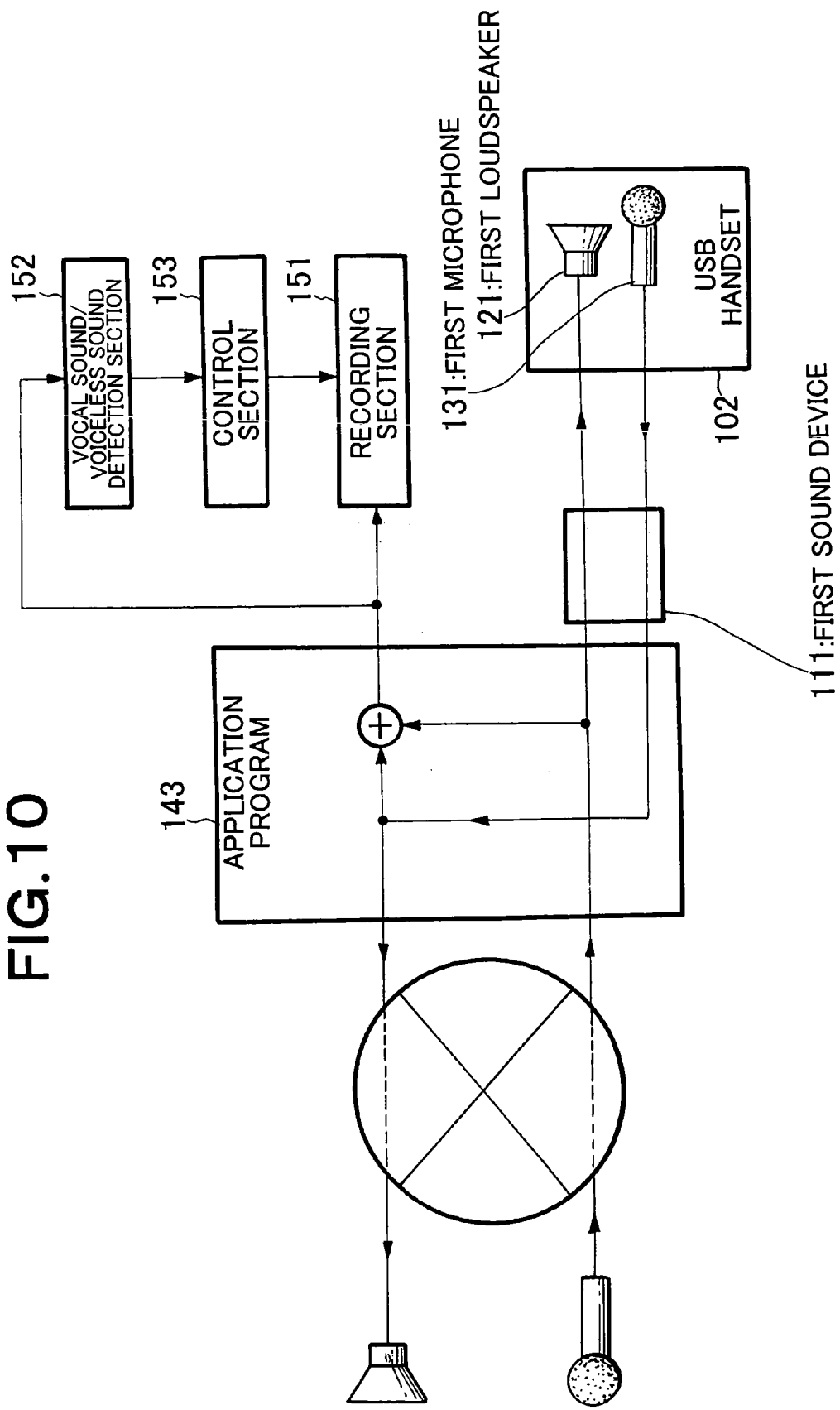

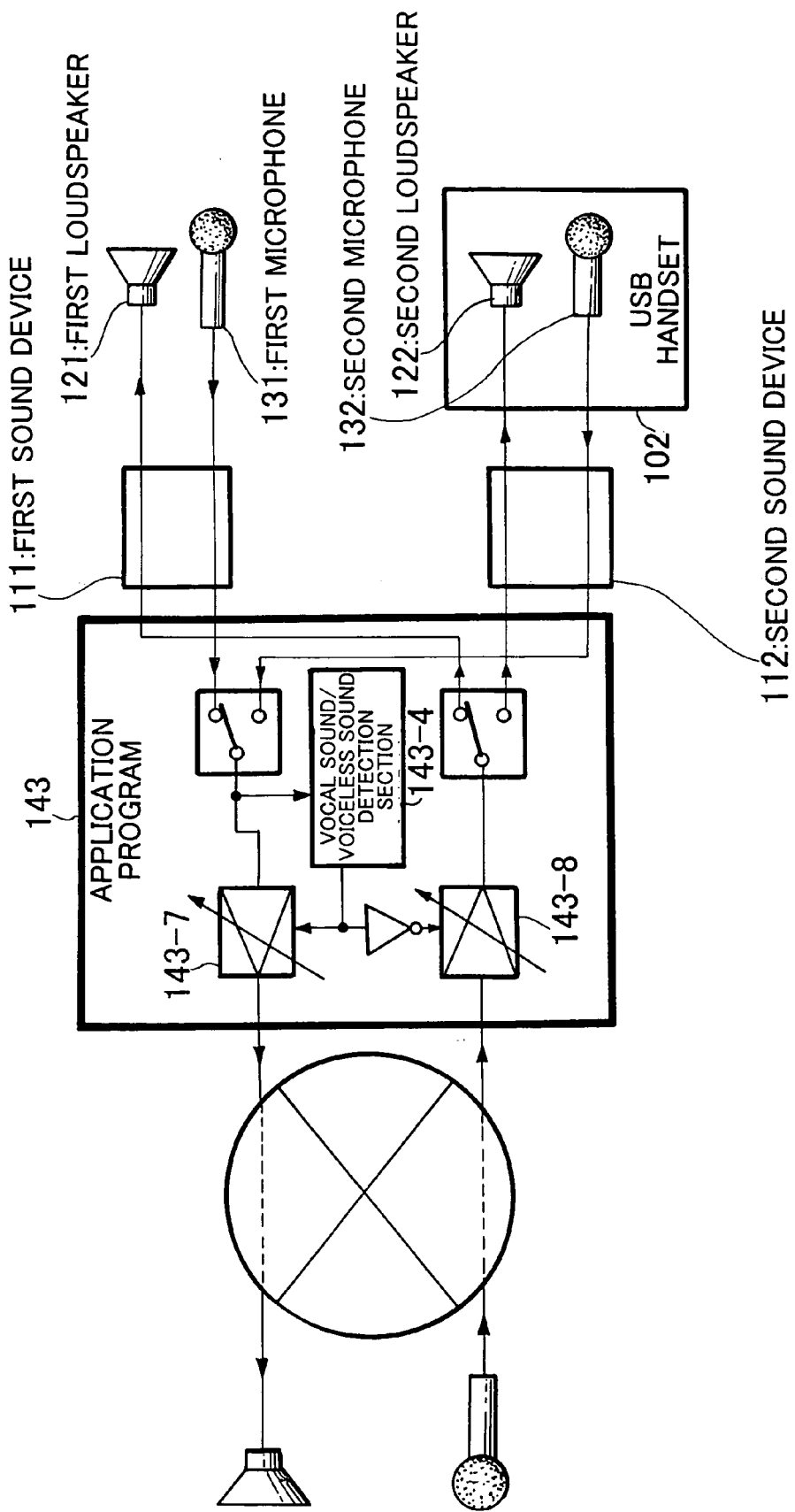

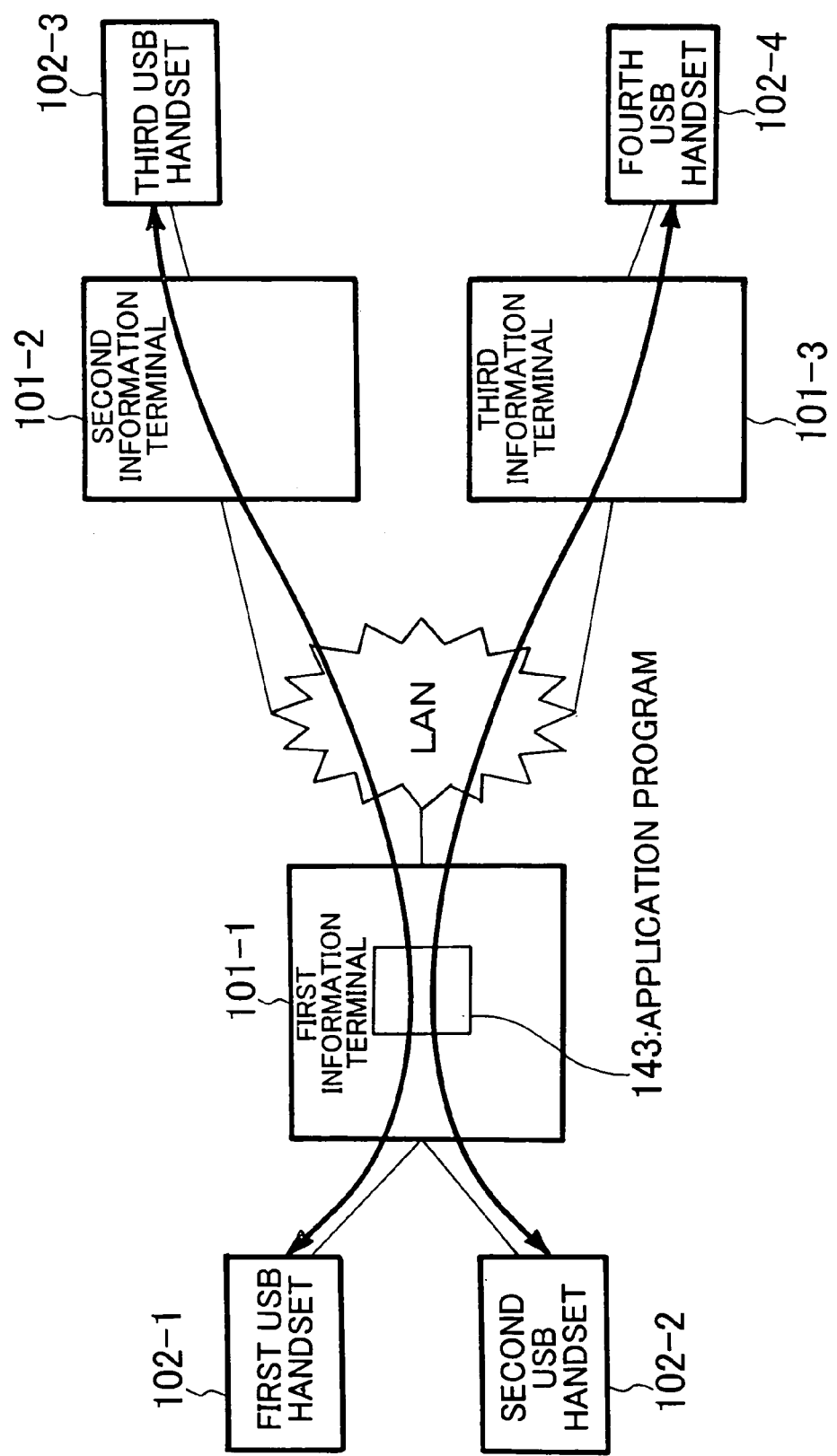

CALL SYSTEM

BACKGROUND OF THE INVENTION

1. Field of the Invention

The present invention relates to a call system for making a handsfree call using a microphone and a loudspeaker connected to an information terminal, and for making a handset call using a handset connected to the information terminal.

2. Description of the Related Art

Recently, an Internet Protocol (hereinafter, "IP") telephone and an Internet telephone for connecting telephone sets to each other through the Internet instead of Public Switched Telephone Network (hereinafter, "PSTN") have appeared. The IP telephone and the Internet telephone are telephones each using a protocol such as an H.323 or a Session Initiation Protocol (hereinafter, "SIP"). With the IP telephone or the Internet telephone, a microphone (see FIG. 1A) and a loudspeaker (see FIG. 1B) are connected to an information terminal such as a personal computer, and the information terminal, the microphone, and the loudspeaker thus connected can be used as a telephone set for handsfree call as a whole. A handset (see FIG. 1C) is connected to the information terminal such as the personal computer by an interface such as a Universal Serial Bus (hereinafter, "USB"), and the information terminal and the handset thus connected can be used as a telephone set for handset call as a whole.

Prior Art Documents related to the present invention are as follows:

Japanese Patent Application Laid-Open No. 2002-94396
Japanese Patent Application Laid-Open No. 2002-345042
Japanese Patent Application Laid-Open No. 2002-368852
Japanese Patent Application Laid-Open No. 09-224081
Japanese Patent Application Laid-Open No. 2002-506325
Japanese Patent Application Laid-Open No. 2002-536883

According to the conventional Internet telephone, however, the handsfree call and the handset call cannot be freely changed over using the information terminal.

SUMMARY OF THE INVENTION

It is, therefore, an object of the present invention to provide a call system capable of freely changing over a handsfree call and a handset call using an information terminal.

According to an aspect of the present invention, there is provided a call system comprising: a handsfree call microphone and a handsfree call loudspeaker; a first sound device that inputs and outputs a sound to the handsfree call microphone and the handsfree call loudspeaker, and that is included in an information terminal; a handset call microphone and a handset call loudspeaker; a second sound device that inputs and outputs the sound to the handset call microphone and the handset call loudspeaker; a handset connected to the information terminal; and selection means for selecting, as a connection destination on a transmitting end of a telephone line, at least one of the first sound device and the second device, and for selecting, as a connection destination on a receiving end the telephone line, at least one of the first sound device and the second sound device in accordance with a call state and an event, so as to set at least one of the handsfree call microphone and the handset call microphone as an input destination of the sound, and so as to set at least one of the handsfree call loudspeaker and the handset call loudspeaker as an output destination of the sound.

In the call system, when the call state is a call arrival state, the handsfree loudspeaker may be set as the output destination of a ringer tone.

In the call system, if a call button on the information terminal is depressed while the call state is a call arrival state, then the selection means may select the first sound device as the telephone line connection destination, and may change the call state to a handsfree call state.

In the call system, if the handset is off hook while the call state is a call arrival state, then the selection means may select the second sound device as the telephone line connection destination, and may change the call state to a handset call state.

In the call system, if a disconnection button on the information terminal is depressed while the call state is a handsfree call state, then the selection means may select neither the first nor second sound devices as the telephone line connection destination, and may change the call state to a waiting state.

In the call system, if the handset is on hook while the call state is a handset call state, then the selection means may select neither the first nor second sound devices as the telephone line connection destination, and may change the call state to a waiting state.

In the call system, if the information terminal performs a calling operation while the call state is a waiting state, and a telephone set of a person on the other end of the telephone line is off hook, then the selection means may select the first sound device as the telephone line connection destination, and may change the call state to a handsfree call state.

In the call system, if the handset performs a calling operation while the call state is a waiting state, and a telephone set of a person on the other end of the telephone line is off hook, then the selection means may select the second sound device as the telephone line connection destination, and may change the call state to a handset call state.

In the call system, if the handset is off hook while the call state is a handsfree call state, then the selection means may select the second sound device as the telephone line connection destination, and may change the call state to a handset call state.

In the call system, if a call button on the information terminal is depressed while the call state is a handset call state, then the selection means may select the first sound device as the telephone line connection destination, and may change the call state to a handsfree state.

In the call system, the selection means may select both the first sound device and the second sound device as the connection destination on the receiving end of the telephone line so as to set, as the output destination of the sound, both the handsfree call loudspeaker and the handset call loudspeaker.

In the call system, the selection means may select both the first sound device and the second sound device as the connection destination on the transmitting end of the telephone line so as to set, as the input destination of the sound, both the handsfree call microphone and the handset call microphone.

The call system may further comprise: addition means for adding up the sound input from the handset call microphone through the second sound device and the sound input from the connection destination on the receiving end of the telephone line, and for outputting an addition value to the handsfree call loudspeaker through the first sound device.

The call system may further comprise: recording means for recording a call; and addition means for adding up the sound input from the handset call microphone through the second sound device and the sound input from the connection destination on the receiving end of the telephone line, and for outputting an addition value to the recording means.

The call system may further comprise: recording means for recording a call; and addition means for adding up the sound input from the handsfree call microphone through the first sound device and the sound input from the connection destination on the receiving end of the telephone line, and for outputting an addition value to the recording means.

The call system may further comprise: gain control means for adjusting a level of the sound to be transmitted to the connection destination on the transmitting end of the telephone line.

The call system may further comprise: gain control means for adjusting a level of the sound transmitted from the connection destination on the receiving end of the telephone line.

The call system may further comprise: gain control means for adjusting a level of the sound transmitted from the connection destination on the receiving end of the telephone line, in accordance with the level of the sound to be transmitted to the connection destination on the transmitting end of the telephone line in a voiceless sound period.

The call system may further comprise: semi-duplex communication means for permitting outputting the sound to be transmitted to the connection destination on the transmitting end of the telephone line and prohibiting outputting the sound transmitted from the connection destination on the receiving end of the telephone line when the sound to be transmitted is present at the connection destination on the transmitting end of the telephone line, and for prohibiting outputting a voiceless sound to the connection destination on the transmitting end of the telephone line and permitting outputting the sound transmitted from the connection destination on the receiving end of the telephone line when no sound to be transmitted is present at the connection destination on the transmitting end of the telephone line.

The call system may further comprise: gain control means for increasing a gain of the sound to be transmitted to the connection destination on the transmitting end of the telephone line and reducing a gain of the sound transmitted from the connection destination on the receiving end of the telephone line when the sound to be transmitted is present at the connection destination on the transmitting end of the telephone line, and for reducing the gain of the sound to be transmitted to the connection destination on the transmitting end of the telephone line and increasing the gain of the sound transmitted from the connection destination on the receiving end of the telephone line when no sound to be transmitted is present at the connection destination on the transmitting end of the telephone line.

The call system may further comprise: a plurality of the handsets; and connection means for connecting the plurality of handsets to different connection destinations, using a table that holds a correspondence between identification information on each of the plurality of handsets and the identification information on each of the different connection destinations.

BRIEF DESCRIPTION OF THE DRAWINGS

FIG. 2 is a block diagram which illustrates a call system according to the first embodiment of the present invention;

FIG. 4 is a conceptual view which illustrates the configuration of a call system according to the second embodiment of the present invention;

FIG. 5 is a conceptual view which illustrates another configuration of the call system according to the second embodiment of the present invention;

FIG. 6 is a conceptual view which illustrates the configuration of a call system according to the third embodiment of the present invention;

FIG. 7 is a conceptual view which illustrates another configuration of the call system according to the third embodiment of the present invention;

FIG. 8 is a conceptual view which illustrates the configuration of a call system according to the fourth embodiment of the present invention;

FIG. 10 is a conceptual view which illustrates another configuration of the call system according to the fourth embodiment of the present invention;

FIG. 16 is a conceptual view which illustrates the configuration of a call system according to the ninth embodiment of the present invention; and FIG. 17 is a conceptual view which illustrates the configuration of a call system according to the tenth embodiment of the present invention.

DETAILED DESCRIPTION OF THE PREFERRED EMBODIMENTS

Figure 1A:
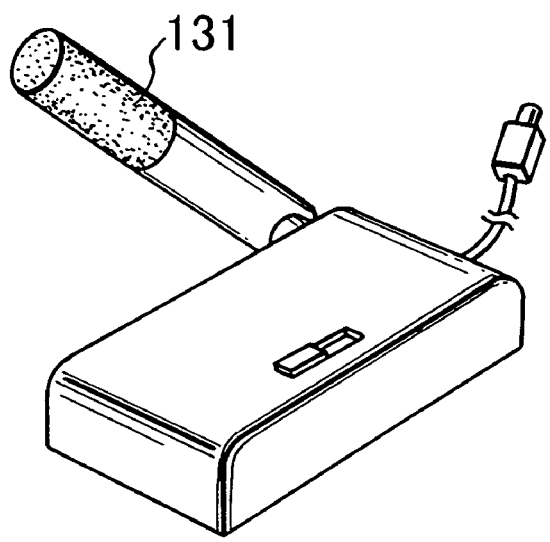
FIG. 1A illustrates an appearance of one example of a microphone for handsfree call employed according to embodiments of the present invention.
Figure 1B:
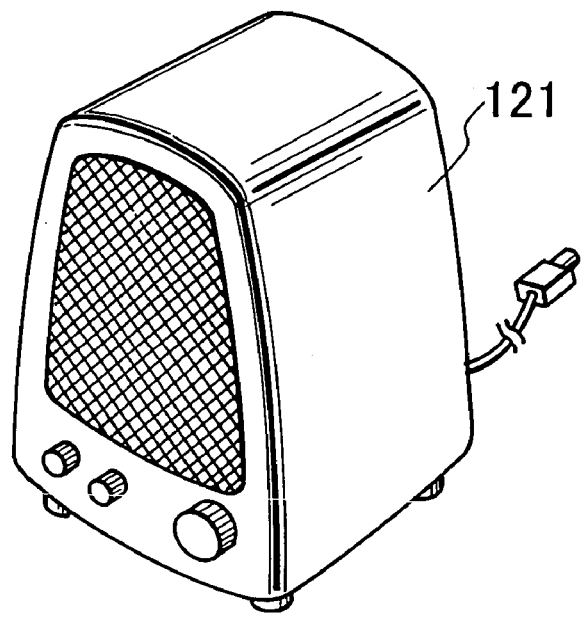
FIG. 1B illustrates an appearance of one example of a loudspeaker for handsfree call employed according to the embodiment of the present invention.
Figure 1C:
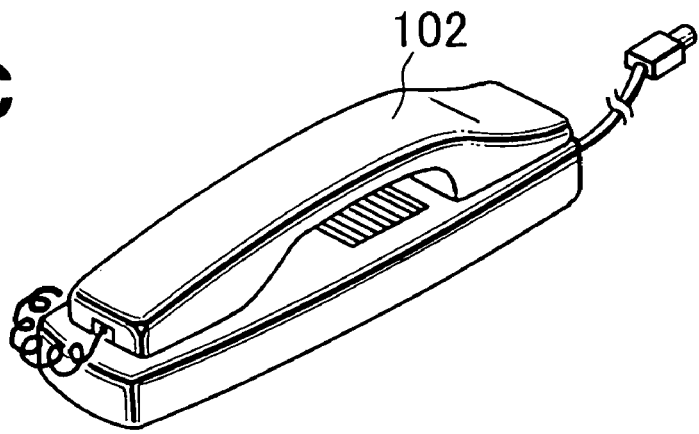
FIG. 1C illustrates an appearance of one example of a handset for handset call employed according to the embodiment of the present invention.

The embodiments of the present invention will be described hereinafter in detail with reference to the drawings.

The present invention is characterized in that if an information terminal such as a personal computer or a Personal Digital Assistant (hereinafter, "PDA") is used for the IP telephone or the Internet telephone, one sound device that inputs and outputs a sound is automatically changed over to another sound device in accordance with a call state.

[First Embodiment]

Referring to FIG. 2, an information terminal 101 is an information terminal such as a personal computer or a PDA, and includes a Central Processing Unit (hereinafter, "CPU") 141, a main memory 142 (e.g., a Dynamic Random Access Memory (hereinafter, "DRAM")), and a first sound device 111 that inputs and outputs a sound. The first sound device 111 is a Peripheral Component Interconnect (hereinafter, "PCI") sound board or an onboard sound device, and includes a microphone input terminal 111-1 and a loudspeaker output terminal 111-2. A first microphone 131 is connected to the microphone input terminal 111-1. A first loudspeaker 121 is connected to the loudspeaker terminal 111-2. The first sound device 111 converts an analog sound input from the first microphone 131 into a digital sound and feeds the digitized sound to the CPU 141 or the like, and converts a digital sound input from the CPU 141 or the like into a digital sound and outputs the digital sound to the first loudspeaker 121. The information terminal 101 includes a Local Area Network (hereinafter, "LAN") interface 101-1 that connects the information terminal 101 to a LAN (not shown), and a USB interface 101-2 that connects the information terminal 101 to the USB. An application program 143 for the IP telephone or the Internet telephone runs on the information terminal 101. Namely, the application program 143 stored in an external storage device or the like is temporarily stored in the main memory 142, read by the CPU 141, and executed. The LAN interface 101-1 is connected to the LAN, and the LAN is connected to the Internet through a router (not shown). The Internet is connected to the PSTN (not shown) through a gateway (not shown). In addition, another IP telephone set is connected to the Internet, and a conventional telephone set is connected to the PSTN.

A USB handset 102 is connected to the information terminal 101 through the USB interface 101-2, and used by a user as a sound input and output device for the IP telephone or the Internet telephone. The USB handset 102 includes therein a second loudspeaker (receiver) 122, a second microphone (transmitter) 132, and a second sound device 112 for making calls. The second sound device 112, which is connected to the second microphone 132 and the second loudspeaker 122, converts an analog sound input from the second microphone 132 into a digital sound and feeds the digital sound to the USB, and converts a digital sound input from the USB into an analog sound and outputs the analog sound to the second loudspeaker 122.

The application program 143 for the IP telephone or the Internet telephone that runs on the information terminal 101 can input and output a sound through the first sound device 111, the second sound device 112, a device driver, and the like.

The application program 143 for the IP telephone or the Internet telephone that runs on the information terminal 101 holds information as to how a call state is, a waiting state, a handset call state, a handsfree call state, or the like in the main memory 142. In accordance with the call state, the information terminal 101 is connected to a person on the other end of the line and changes the sound device for inputting and outputting the sound.

Figure 3:
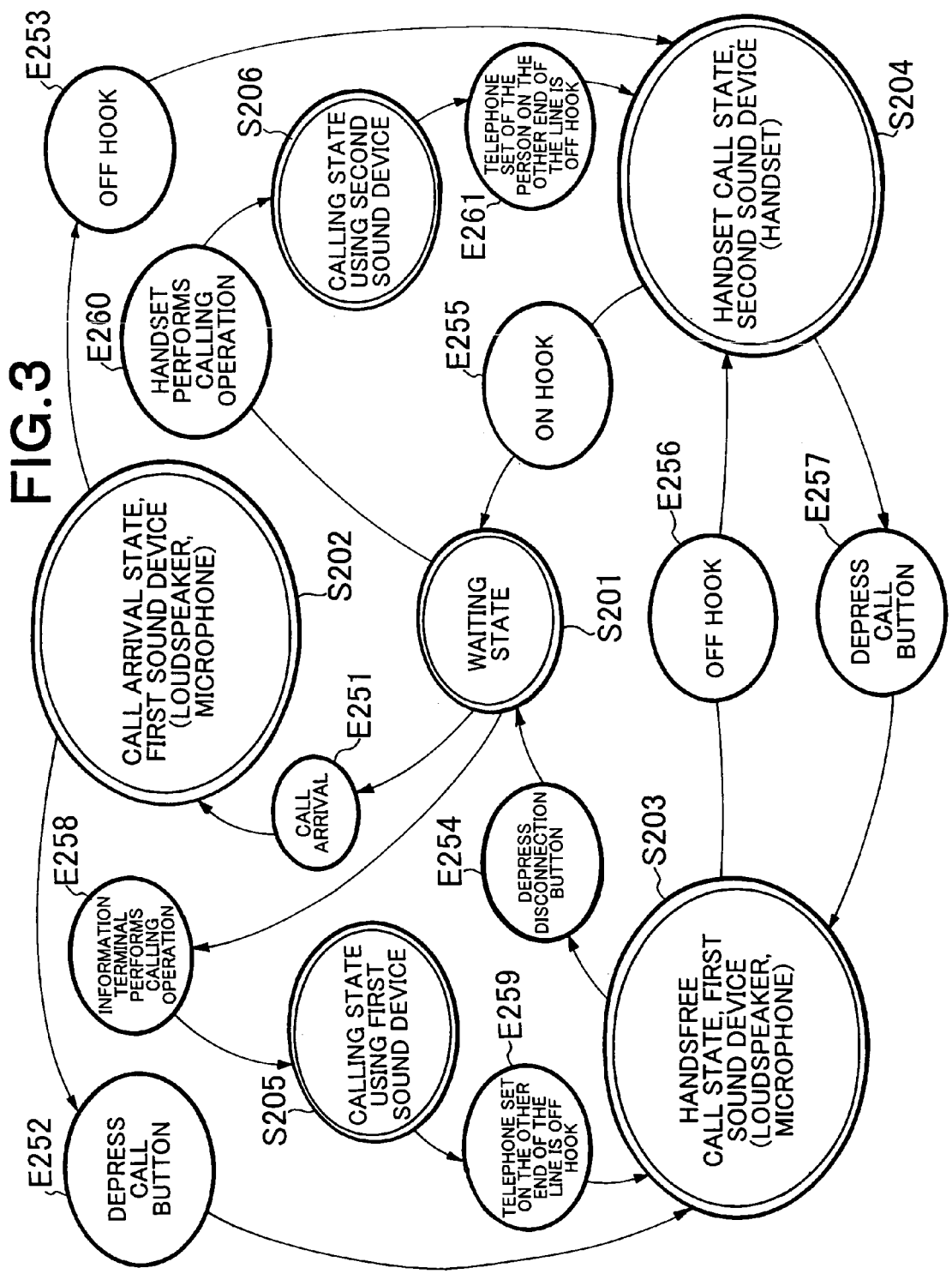
FIG. 3 is a state transition view which illustrates a state managed by an application program of the call system and the transition of the state according to the first embodiment of the present invention.

FIG. 3 is a state transition view which illustrates a call state controlled by the application program 143 and the transition of the call state. Referring to FIG. 3, call states include the waiting state S201, a call arrival state S202, the handsfree call state 203, the handset call state 204, a calling state S205 using the first sound device 111, and a calling state S206 using the second sound device 112.

The application program 143 functions as selection means for selecting at least one of the first sound device 111 and the second sound device 112 as a telephone line connection destination so as to select at least one of the first microphone 131 and the second microphone 132 as a sound input destination and so as to select at least one of the first loudspeaker 121 and the second loudspeaker 122 as a sound output destination. The application program 143 makes selection as follows.

If a call arrives while the call state is the waiting state S201 (E251), the call state is changed to the call arrival state S202. In the call arrival state S202, the first sound device 111 produces a ringer tone from the first loudspeaker 121.

If a call button on the information terminal 101 is depressed while the call state is the call arrival state S202 (E252), then the telephone line connection destination is set at the first sound device and the call state is changed to the handsfree call state S203. The "depression of the call button on the information terminal 101" may be either the depression of a mechanical call button on the information terminal 101 or the depression of a visual call button displayed on a screen of the information terminal 101 by a keyboard or a mouse of the information terminal 101.

If the USB handset 102 is off hook while the call state is the call arrival state S202 (E253), then the telephone line connection destination is set at the second sound device 112 and the call state is changed to the handset call state S204.

If a disconnection button on the information terminal 101 is depressed while the call state is the handsfree call state S203 (E254), then no telephone line connection destination is set and the call state is changed to the waiting state S201. The "depression of the disconnection button on the information terminal 101" may be either the depression of a mechanical disconnection button on the information terminal 101 or the depression of a visual disconnection button displayed on the screen of the information terminal 101 by the keyboard or the mouse.

If the USB handset 102 is on hook while the call state is the handset call state S204 (E255), then no telephone line connection destination is set and the call state is changed to the waiting state S201.

If the information terminal 101 performs a calling operation while the call state is the waiting state S201 (E258), then the call state is changed to the calling state S205 using the first sound device 111. If a telephone set of the person on the other end of the line is off hook after the call state is changed to the calling state S205 (E259), then the telephone line connection destination is set at the first sound device 111 and the call state is changed to the handsfree call state S203.

If the USB handset 102 performs a calling operation while the call state is the waiting state S201 (E260), then the call state is changed to the calling state S206 using the second sound device 112. If the telephone set of the person on the other end of the line is off hook after the call state is changed to the calling state S206 (E261), then the telephone line connection destination is set at the second sound device 112 and the call state is changed to the handset call state S204.

If the USB handset 102 is off hook while the call state is the handsfree state S203 (E256), the telephone line connection destination is set at the second sound device 112 and the call state is changed to the handset call state S204.

If the call button on the information terminal 101 is depressed while the call state is the handset call state S204 (E257), the telephone line connection destination is set at the first sound device 111 and the call state is changed to the handsfree call state S203.

As can be understood, according to the present invention, one sound device that inputs and outputs a sound is changed over to another sound device according to the call state. Therefore, differently from the conventional art, a disadvantage in that a ringer tone is inaudible since it is not output from the handset does not occur. In addition, the handset call and the handsfree call can be freely changed over on the application program 143.

[Second Embodiment]

The second embodiment is intended to improve a conventional disadvantage in that if a handset call is to be made, persons around the speaker or user cannot hear a sound of a person on the other end of the line, and to enable even those other than the user to hear the sound of the person on the other end of the line.

Referring to FIG. 4, if the user performs a predetermined operation on the screen of the information terminal 101 displayed by the application program 143 in the handset call state S204, the application program 143 distributes the sound of the person on the other end of the line that has been output only to the second sound device 112 so far, to both the first sound device 111 and the second sound device 112. By so distributing, the sound of the person on the other end of the line is output not only from the second loudspeaker 122 of the USB handset 102 but also from the first loudspeaker 121 for handsfree call.

As shown in FIG. 5, not only the sound input from the second sound device 112 but also the sound input from the first sound device 111 may be transmitted to the person on the other end of the line. If so, it is possible to transmit not only the sound input from the second microphone 132 of the USB handset 102 but also the sound input from the first microphone 131 for handsfree call to the person on the other end of the line. In this case, however, it is necessary to suppress each of an amplification gain of the sound to be output from the first loudspeaker 121 and an amplification gain of the sound input from the first microphone 131 to be a predetermined value or less so as to prevent a howl.

[Third Embodiment]

The third embodiment is intended to improve a conventional disadvantage in that if a handset call is to be made, persons around the speaker or user cannot hear a conversation (dialogue), and to enable those other than the user to hear the conversation (dialogue).

Referring to FIG. 6, if the user performs a predetermined operation on the screen of the information terminal 101 displayed by the application program 143 in the handset call state S204, the application program 143 adds up the sound of the person on the other end of the line and the sound input from the second microphone 132, and outputs the added sound to the first sound device 111. By doing so, the sound of the person on the other end of the line is output not only from the second loud speaker 122 of the USB handset 102 but also from the first loudspeaker 121 for handsfree call, and the sound input from the second microphone 132 of the USB handset 102 is output from the first loudspeaker 121 for handsfree call.

As shown in FIG. 7, not only the sound input from the second sound device 112 but also the sound input from the first sound device 111 may be transmitted to the person on the other end of the line. By doing so, not only the sound input from the second microphone 132 of the USB handset 102 but also the sound input from the first microphone 131 for handsfree call can be transmitted to the person on the other end of the line. In this case, however, it is necessary to suppress each of the amplification gain of the sound to be output from the first loudspeaker 121 and the amplification gain of the sound input from the first microphone 131 to be equal to or lower than a predetermined value so as to prevent a howl.

[Fourth Embodiment]

As shown in FIG. 8, the application program 143 may add up the sound of the person on the other end of the line and the sound input from the second microphone 132 of the USB handset 102, and record the added sound in a recording section 151. The application program 143 may output the added sound either only to the recording section 151 or to both the recording section 151 and the first sound device 111.

In order to save a capacity of a recording medium that records sound and to prevent a voiceless sound period from appearing during reproduction, a vocal sound/voiceless sound detection section 152 may be provided to detect whether there is a vocal sound or a voiceless sound. In addition, a control section 153 may be provided to stop a recording operation of the recording section 151 in the voiceless sound period, and to permit the recording operation only in a vocal sound period.

Figure 9A:
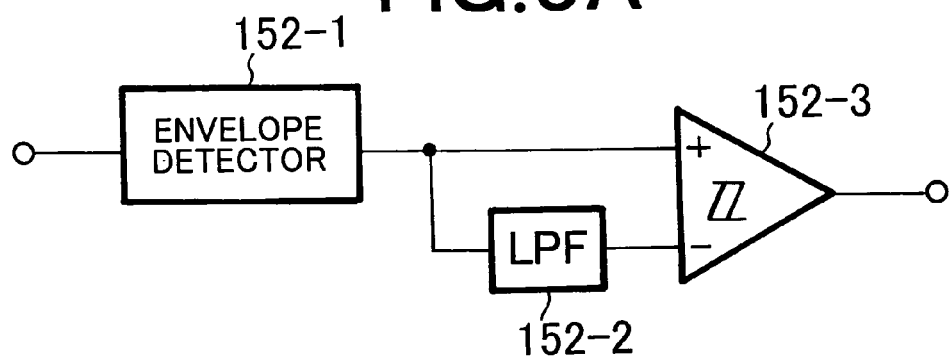
FIG. 9A illustrates one example of the configuration of a vocal sound/voiceless sound detection section.

As shown in FIG. 9A, the vocal sound/voiceless sound detection section 152 includes, for example, an envelope detector 152-1, a lowpass filter (hereinafter "LPF") 152-2, and a Schmidt trigger comparator 152-3.

As shown in FIG. 10, the application program 143 may add up the sound of the person on the other end of the line and the sound input from the first microphone 131 for handsfree call, and record the added sound in the recording section 151.

[Fifth Embodiment]

The fifth embodiment is intended to improve a conventional disadvantage in that if an absolute level of the sound input from the first microphone 131 for handsfree call or the second microphone 132 of the USB handset 102 is excessively high, a sound distortion occurs to the telephone set of the person on the other end of the line, and a conventional disadvantage in that if the absolute level is excessively low, the person on the other end of the line cannot hear the sound of the user even by setting a volume at a maximum on the side of the person on the other end of the line, and to enable automatically adjusting an input voice to a proper level.

Figure 11:
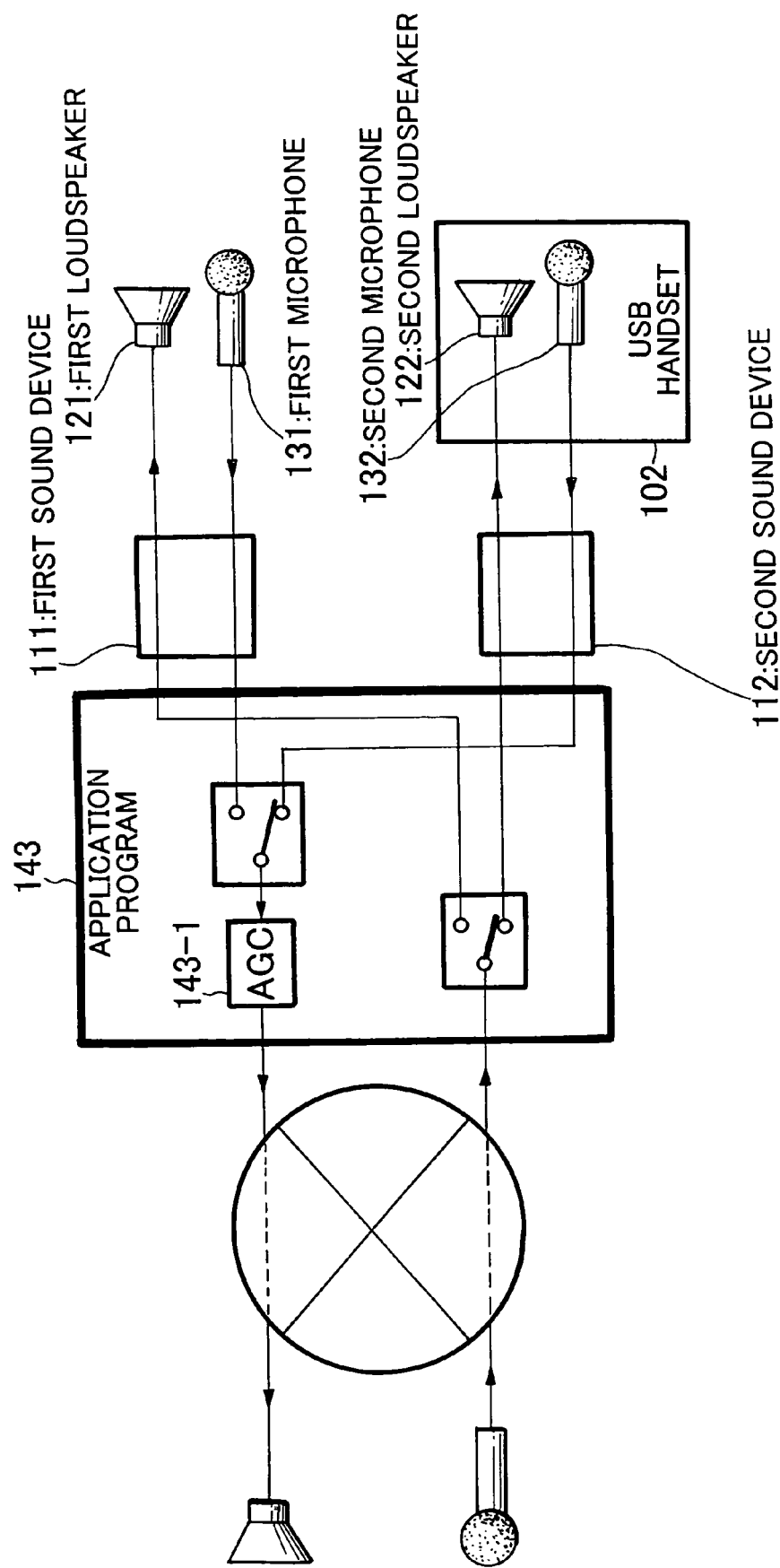
FIG. 11 is a conceptual view which illustrates the configuration of a call system according to the fifth embodiment of the present invention.

As shown in FIG. 11, the application program 143 includes an automatic gain control (hereinafter "AGC") section 143-1. The AGC section 143-1 controls a gain of the sound input from the first microphone 131 for handsfree or that of the sound input from the second microphone 132 of the USB handset 102 so that a maximum of the absolute level of the sound input from the first microphone 131 for handsfree call or that input from the second microphone 132 of the USB handset 102 is constant.

Figure 9B:
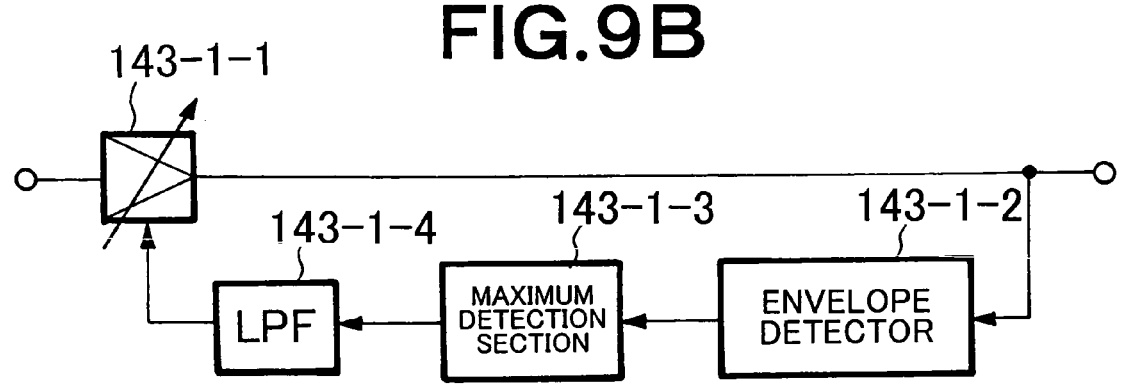
FIG. 9B illustrates one example of the configuration of an automatic gain control section.

As shown in FIG. 9B, the AGC section 143-1 includes, for example, a variable gain amplifier 143-1-1, an envelope detector 143-1-2, a maximum detection section 143-1-3, and an LPF 143-1-4. The maximum detection section 143-1-3 may reduce a detected maximum with the passage of time.

[Sixth Embodiment]

The sixth embodiment is intended to automatically adjust the correction of a volume of a received sound that has been conventionally made by the user himself or herself.

Figure 12:
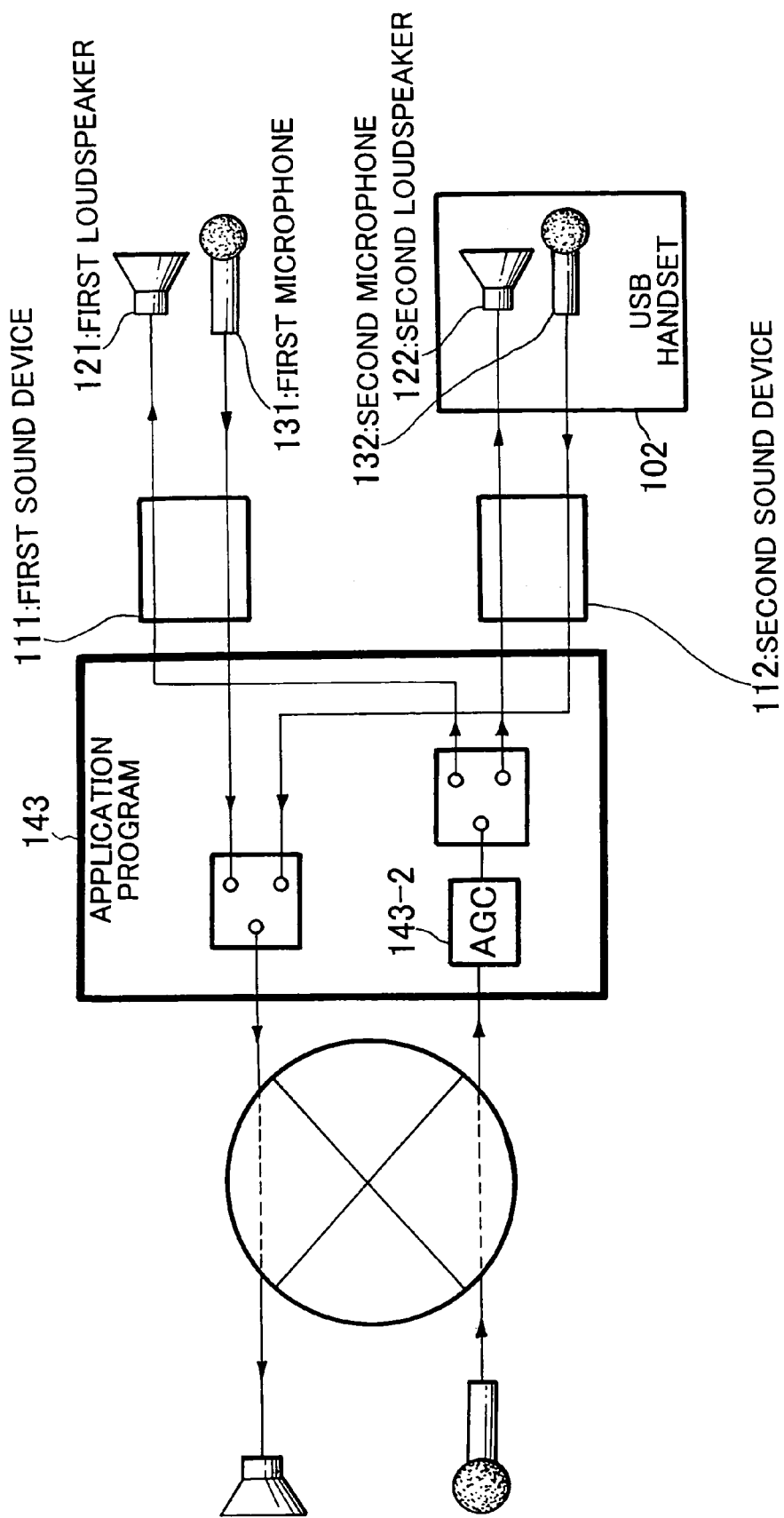
FIG. 12 is a conceptual view which illustrates the configuration of a call system according to the sixth embodiment of the present invention.

As shown in FIG. 12, the application program 143 includes an AGC section 143-2. The AGC 143-2 controls a gain of the volume of the sound transmitted from the person on the other end of the line so that the maximum of the absolute level of the sound transmitted from the person on the other end of the line is constant.

As shown in FIG. 9B, the AGC section 143-2 includes, for example, the variable gain amplifier 143-1-1, the envelope detector 143-1-2, the maximum detection section 143-1-3, and the LPF 143-1-4. The maximum detection section 143-1-3 may reduce the detected maximum with the passage of time.

[Seventh Embodiment]

The seventh embodiment is intended to correct the volume of the received sound (exercise gain control) based on a peripheral noise level, and to enable the user to always hear the sound with an audible volume.

Figure 13:
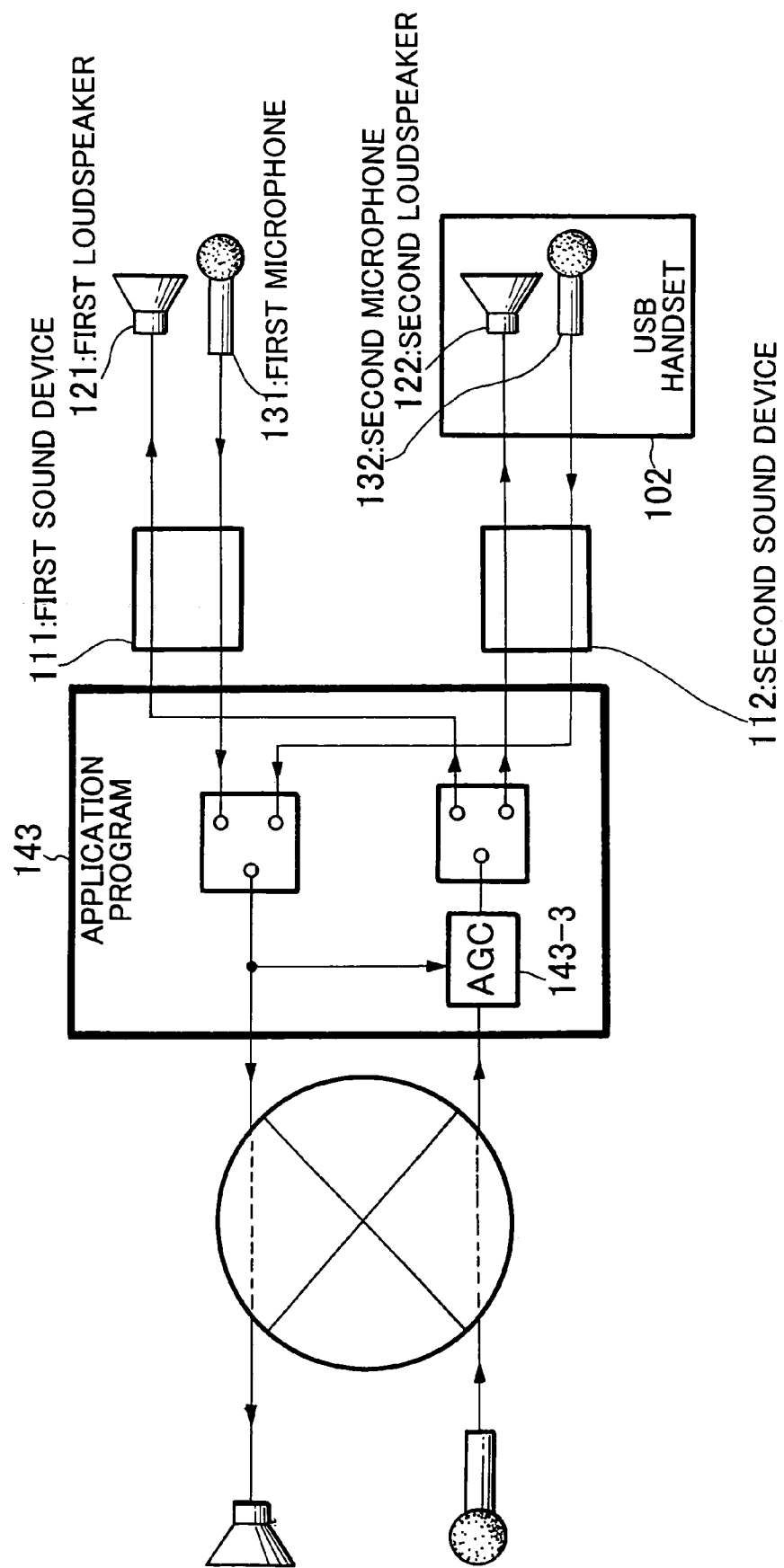
FIG. 13 is a conceptual view which illustrates the configuration of a call system according to the seventh embodiment of the present invention.

As shown in FIG. 13, the application program 143 includes an AGC section 143-3. The AGC section 143-3 controls the gain of the volume of the sound transmitted from the person on the other end of the line so that a ratio of the maximum absolute level of the volume of the sound transmitted from the person on the other end of the line to the level of a peripheral noise collected by the first microphone 131 for handsfree call or the second microphone 132 of the USB handset 102 is a predetermined value.

Figure 14:
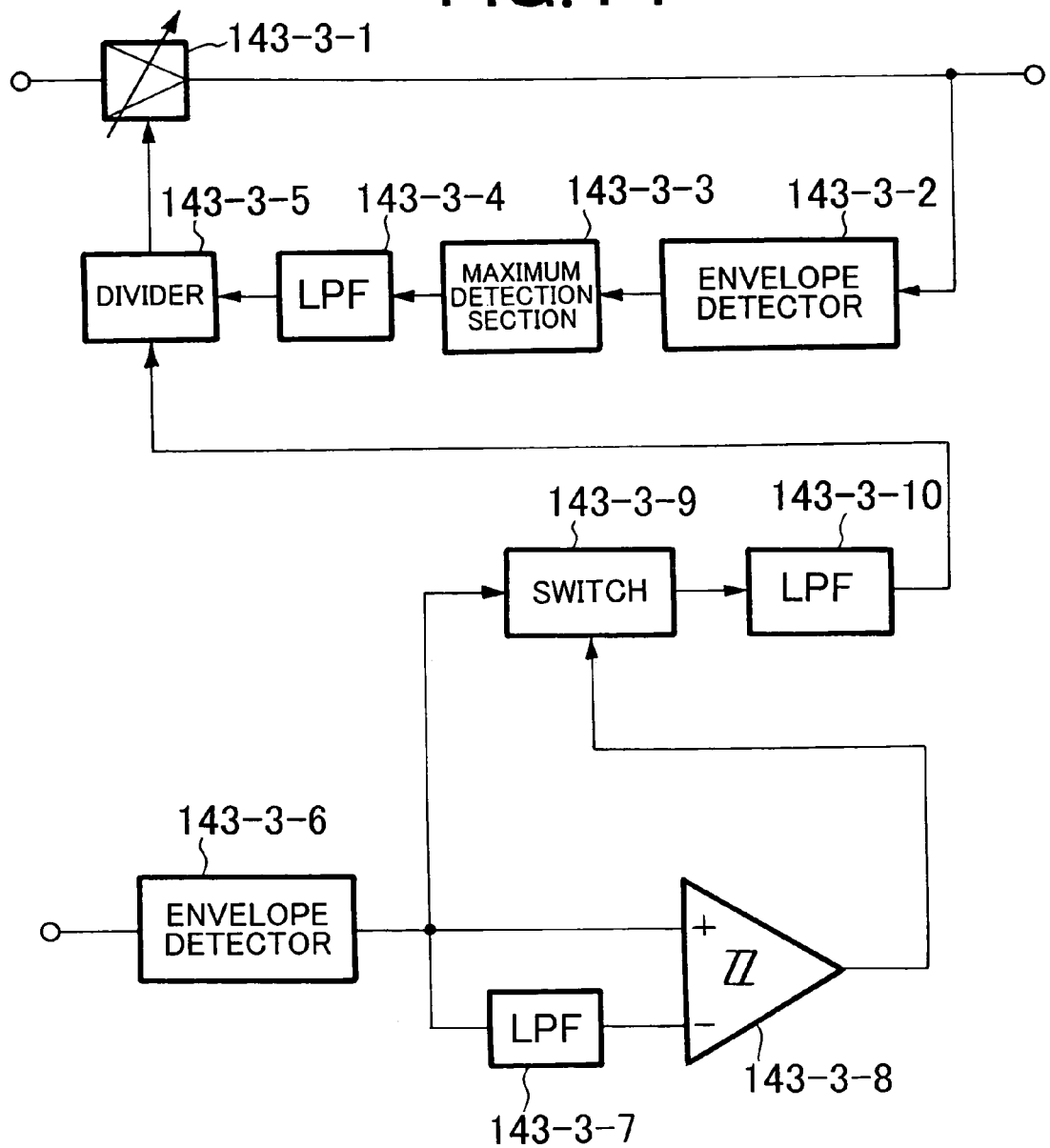
FIG. 14 illustrates one example of the configuration of an automatic gain control section.

As shown in FIG. 14, the AGC section 143-3 includes, for example, a variable gain amplifier 143-3-1, an envelope detector 143-3-2, a maximum detection section 143-3-3, an LPF 143-3-4, a divider 143-3-5, an envelope detector 143-3-6, an LPF 143-3-7, a Schmidt trigger comparator 143-3-8, a switch 143-3-9, and an LPF 143-3-10. The variable gain amplifier 143-3-1 is similar to the variable gain amplifier 143-1-1, and the envelope detector 143-3-2 is similar to the envelope detector 143-1-2. The maximum detection section 143-3-3 is similar to the maximum detection section 143-1-3, and the LPF 143-3-4 is similar to the LPF 141-1-4. The envelope detector 143-3-6 is similar to the envelope detector 152-1, the LPF 143-3-7 is similar to the LPF 152-2, and the Schmidt trigger comparator 143-3-8 is similar to the Schmidt trigger comparator 152-3.

The variable gain amplifier 143-3-1 amplifies an input sound signal transmitted from the person on the other end of the line by the gain so that a quotient output from the divider 143-3-5 is constant. The envelope detector 143-3-2 detects an envelope of an output of the variable gain amplifier 143-3-1. The maximum detection section 143-3-3 detects a maximum of an output of the envelope detector 143-3-2. The maximum detection section 143-3-3 may output the detected maximum while reducing it with the passage of time. The LPF 143-3-4 causes only low frequency components of an output of the maximum detection section 143-3-3 to pass. The divider 143-3-5 divides a level of an output of the LPF 143-3-4 by a level of an output of the LPF 143-3-10, and outputs the quotient to the variable gain amplifier 143-3-1. The envelope detector 143-3-6 detects an envelope of an input sound signal on the user's side. The LPF 143-3-7 causes only low frequency components of an output of the envelope detector 143-3-6 to pass. The Schmidt trigger comparator 143-3-8 compares a level of an output of the envelope detector 143-3-6 with that of the LPF 143-3-7, and outputs a comparison result. The Schmidt trigger comparator 143-3-8 has hysteresis characteristics. The switch 143-3-9 selects and outputs only the output of the envelope detector 143-3-6 in a voiceless sound period in accordance with an output of the Schmidt trigger comparator 143-3-8. In addition, the switch 143-3-0 holds a level of the output of the envelope detector 143-3-6 in a priority period just before a vocal sound period, in the vocal period. The LPF 143-3-10 causes only low frequency components of an output of the switch 143-3-9 to pass.

[Eighth Embodiment]

The eighth embodiment is intended to make a semi-duplex communication handsfree call. If the user is to make a handsfree call, the first loudspeaker 121 and the first microphone 131 are used, positions of which are freely set. Therefore, if the first microphone 131 is disposed near the first loudspeaker 121, a howl often occurs. The eighth embodiment is intended to prevent the howl by holding a pseudo, semi-duplex communication while using full duplex lines.

Figure 15:
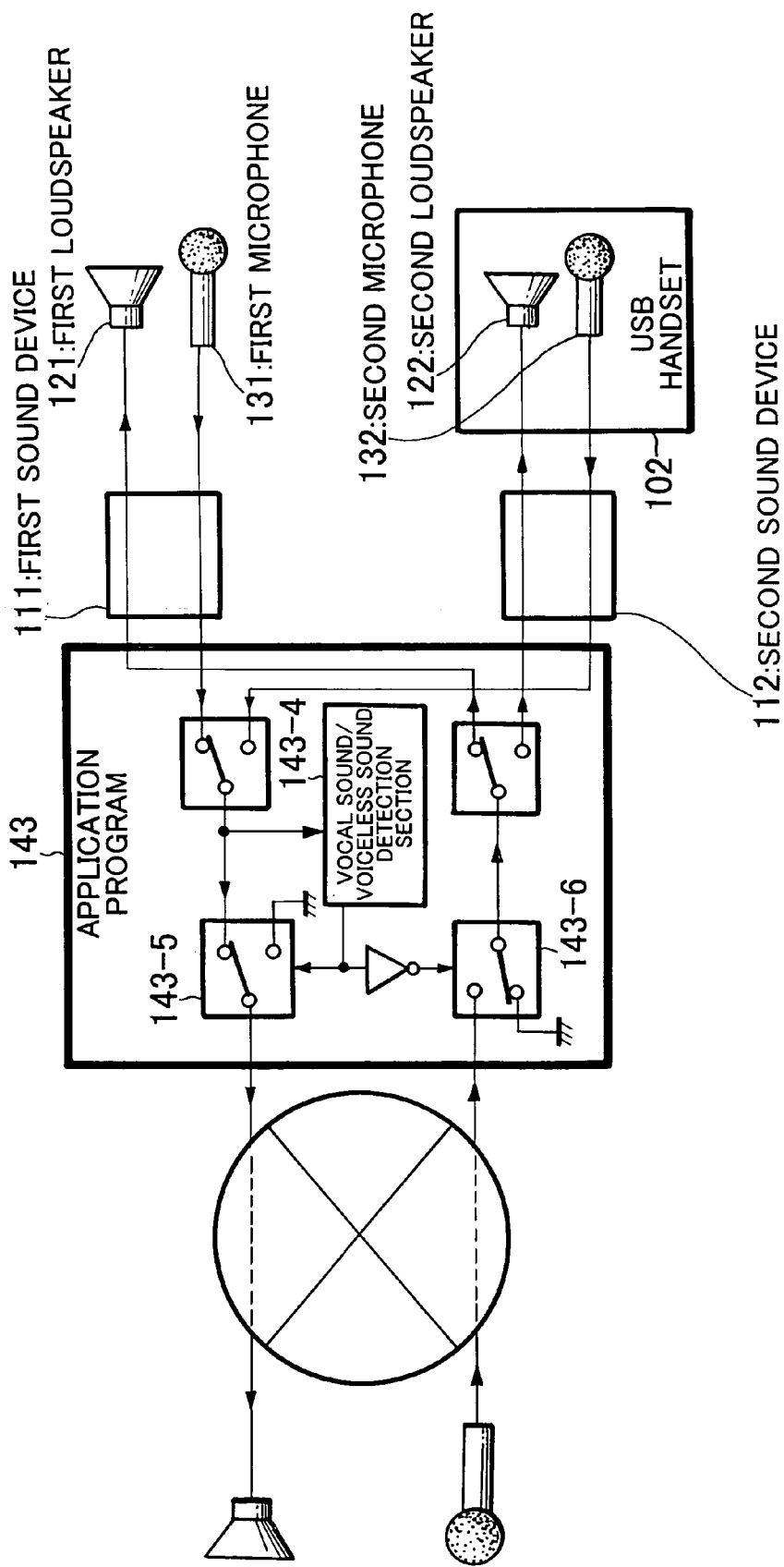
FIG. 15 is a conceptual view which illustrates the configuration of a call system according to the eighth embodiment of the present invention.

As shown in FIG. 15, the application program 143 includes a vocal sound/voiceless sound detection section 143-4, and switches 143-5 and 143-6. The configuration of the vocal sound/voiceless sound detection section 143-4 is, for example, the same as that shown in FIG. 9A.

The vocal sound/voiceless sound detection section 143-4 detects a vocal sound period and a voiceless sound period of a signal from the first microphone 131. In the vocal sound period, the vocal sound/voiceless sound detection section 143-4 turns on the switch 143-5 to transmit the sound from the first microphone 131 to the person on the other end of the line, and turns off the switch 143-6 so as not to output the sound of the person on the other end of the line to the first loudspeaker 121. In the voiceless sound period, the vocal sound/voiceless sound detection section 143-4 turns off the switch 143-5 so as not to transmit the sound from the first microphone 131 to the person on the other end of the line, and turns on the switch 143-6 to output the sound of the person on the other end of the line from the first loudspeaker 121.

[Ninth Embodiment]

The ninth embodiment is equal to the eighth embodiment in that the both embodiments are intended to prevent the howl during a handsfree call but differs from the eighth embodiment in a method of realizing howl prevention.

As shown in FIG. 16, the application program 143 includes the vocal sound/voiceless sound detection section 143-4, and variable gain amplifiers 143-7 and 143-8. The configuration of the vocal sound/voiceless sound detection section 143-4 is, for example, the same as that shown in FIG. 9A.

The vocal sound/voiceless sound detection section 143-4 detects the vocal sound period and the voiceless sound period of the signal from the first microphone 131. In the vocal sound period, the vocal sound/voiceless sound detection section 143-4 increases a gain of the variable gain amplifier 143-7 and reduces a gain of the variable gain amplifier 143-8. In the voiceless sound period, the vocal sound/voiceless sound detection section 143-4 reduces the gain of the variable gain amplifier 143-7 and increases the gain of the variable gain amplifier 143-8.

According to the ninth embodiment, differently from the eighth embodiment, even if the sound of the user is in the vocal sound period, the sound of the person on the other end of the line is audible.

[Tenth Embodiment]

The tenth embodiment is intended to connect a plurality of USB handsets to one information terminal, and to enable the respective USB handsets to make calls to different persons.

FIG. 17 illustrates the form of connection according to the tenth embodiment. Referring to FIG. 17, two USB handsets (a first USB handset 102-1 and a second USB handset 102-2), for example, are connected to a first information terminal 101-1. The first and second USB handsets 102-1 and 102-2 are connected to the application program 143.

Similarly to the first to ninth embodiments, one USB handset (a third USB handset 102-3) is connected to a second information terminal 101-2, and one USB handset (a fourth USB handset 102-4) is connected to a third information terminal 101-3.

The party on the other end of the line for the first USB handset 102-1 is the third USB handset 102-3, and that for the second USB handset 102-2 is the fourth USB handset 102-4.

The first information terminal 101-1 discriminates the first USB handset 102-1 and the second USB handset 102-2 from each other by checking USB device numbers and channels allocated to the respective USB handsets 102-1 and 102-2. In addition, the first information terminal 101-1 discriminates the third USB handset 102-3 and the fourth USB handset 102-4 by checking pairs of IP addresses and Real-Time Transport Protocols (hereinafter, "RTP") allocated to the respective handsets 102-3 and 102-4. By thus discriminating, it is possible to connect the first USB handset 102-1 to the third USB handset 102-3, and the second USB handset 102-2 to the fourth USB handset 102-4.

To realize the connection of the first USB handset 102-1 to the third USB handset 102-3, and the second USB handset 102-2 to the fourth USB handset 102-4, the application program 143 holds an intra-application channel management table shown below. Each record of the intra-application channel management table includes such fields as a channel field, a USB device field, a counterpart IP address field, and an RTP port number field. One record is provided for each communication direction of each call.

The setting of the intra-application channel management table made by the application program 143 will next be described.

If the first USB handset 102-1 and the second USB handset 102-2 are allocated channels, respectively, the intra-application channel management table is set as shown below.

| Intra-application channel management table of first information terminal | | | |
|---|---|---|---|
| Channel | USB device | Counterpart IP address | RTP port number |
| Channel 1 transmission | USB device 1 | | |
| Channel 1 reception | USB device 1 | | |
| Channel 2 transmission | USB device 2 | | |
| Channel 2 reception | USB device 2 | | |

Thereafter, if a call is made from the first USB handset 102-1 to the third USB handset 102-3, the intra-application channel management table is set as shown below.

| Intra-application channel management table of first information terminal | | | |
|---|---|---|---|
| Channel | USB device | Counterpart IP address | RTP port number |
| Channel 1 transmission | USB device 1 | IP address of third information terminal | |
| Channel 1 reception | USB device 1 | IP address of third information terminal | |
| Channel 2 transmission | USB device 2 | | |
| Channel 2 reception | USB device 2 | | |

Next, if the first information terminal 101-1 and the second information terminal 101-2 determine transmission and reception RTP port numbers for the first USB handset 102-1 and the third USB handset 102-3, respectively, the intra-application channel management table is set as shown below.

| Intra-application channel management table of first information terminal | | | |
|---|---|---|---|
| Channel | USB device | Counterpart IP address | RTP port number |
| Channel 1 transmission | USB device 1 | IP address of third information terminal | A |
| Channel 1 reception | USB device 1 | IP address of third information terminal | B |
| Channel 2 transmission | USB device 2 | | |
| Channel 2 reception | USB device 2 | | |

Next, if a call is made from the second USB handset 102-2 to the fourth USB handset 102-4 and the first information terminal 101-1 and the third information terminal 101-3 determine transmission and reception RTP port numbers for the second USB handset 102-2 and the fourth USB handset 102-4, respectively, the intra-application channel management table is set as shown below.

| Intra-application channel management table of first information terminal | | | |
|---|---|---|---|
| Channel | USB device | Counterpart IP address | RTP port number |
| Channel 1 transmission | USB device 1 | IP address of third information terminal | A |
| Channel 1 reception | USB device 1 | IP address of third information terminal | B |
| Channel 2 transmission | USB device 2 | IP address of fourth information terminal | C |
| Channel 2 reception | USB device 2 | IP address of fourth information terminal | D |

As stated so far, according to the present invention, it is possible to allow the user to freely select one of or both of the handsfree call and the handset call and make the selected call.

According to the present invention, the voice of the person on the other end of the line can be output from the handsfree call loudspeaker while a handset call is being made. Therefore, persons other than the user who is making the handset call can hear the sound of the person on the other end of the line.

According to the present invention, the sound input from the handsfree call microphone and the sound input from the microphone of the handset can be transmitted to the person on the other end of the line. Therefore, sounds of a plurality of people on the user's side can be transmitted to the person on the other end of the line.

According to the present invention, the voice of the person on the other end of the line and the voice picked up by the microphone of the hand set can be output from the handsfree call loudspeaker while a handset call is being made. Therefore, those other than the persons who are holding a telephone conversation can hear the sounds of the user and the person on the other end of the line.

According to the present invention, the sound of the person on the other end of the line and the sound input from the microphone of the handset can be recorded while a handset call is being made.

According to the present invention, the sound of the person on the other end of the line and the sound input from the handsfree call microphone can be recorded while a handsfree call is being made.

According to the present invention, the level of the sound to be transmitted to the connection destination on the transmitting end of the telephone line is adjusted. Therefore, the person on the other end of the line can hear the sound with an appropriate sound volume.

According to the present invention, the level of the sound transmitted from the connection destination on the receiving end of the telephone line is adjusted. Therefore, the user can hear the sound of the person on the other end of the line with an appropriate sound volume.

According to the present invention, the level of the sound transmitted from the connection destination on the receiving end of the telephone line is adjusted in accordance with the sound to be transmitted to the connection destination on the transmitting end of the telephone line in the voiceless sound period. Therefore, even if there is a background noise on the user's side, the user can hear the sound of the person on the other end of the line with an appropriate sound volume in accordance with a level of the background noise.

Further, the output of the sound to be transmitted to the connection destination on the transmitting end of the telephone line is permitted, and the output of the sound transmitted from the connection destination on the receiving end of the telephone line is prohibited when the sound to be transmitted is present at the connection destination on the transmitting end of the telephone line. In addition, the output of a voiceless sound to the connection destination on the transmitting end of the telephone line is prohibited, and the output of the sound transmitted from the connection destination on the receiving end of the telephone line is permitted when no sound to be transmitted is present at the connection destination on the transmitting end of the telephone line. Therefore, it is possible to prevent a howl.

The gain of the sound to be transmitted to the connection destination on the transmitting end of the telephone line is increased, and the gain of the sound transmitted from the connection destination on the receiving end of the telephone line is reduced when the sound to be transmitted is present at the connection destination on the transmitting end of the telephone line. In addition, the gain of the sound to be transmitted to the connection destination on the transmitting end of the telephone line is reduced, and the gain of the sound transmitted from the connection destination on the receiving end of the telephone line is increased when no sound to be transmitted is present at the connection destination on the transmitting end of the telephone line. Therefore, it is possible to prevent a howl.

Moreover, the call system includes a plurality of the handsets, and the handsets are connected to different connection destinations using a table that holds a correspondence between identification information on each of the handsets and the identification information on each of the connection destinations. Therefore, it is possible to realize a plurality of calls using single information equipment.

What is claimed is:

1. A call system comprising:
   a handsfree call microphone and a handsfree call loudspeaker;
   a first sound device that inputs and outputs a sound to the handsfree call microphone and the handsfree call loudspeaker, and that is included in an information terminal;
   a handset call microphone and a handset call loudspeaker;
   a second sound device that inputs and outputs the sound to the handset call microphone and the handset call loudspeaker;
   a handset connected to the information terminal; and
   selection means for selecting, as a connection destination on a transmitting end of a telephone line, at least one of the first sound device and the second device, and for selecting, as a connection destination on a receiving end the telephone line, at least one of the first sound device and the second sound device in accordance with a call state and an event, so as to set at least one of the handsfree call microphone and the handset call microphone as an input destination of the sound, and so as to set at least one of the handsfree call loudspeaker and the handset call loudspeaker as an output destination of the sound.

2. The call system according to claim 1, wherein
   when the call state is a call arrival state, the handsfree loudspeaker is set as the output destination of a ringer tone.

3. The call system according to claim 1, wherein
   if a call button on the information terminal is depressed while the call state is a call arrival state, then the selection means selects the first sound device as the telephone line connection destination, and changes the call state to a handsfree call state.

4. The call system according to claim 1, wherein
   if the handset is off hook while the call state is a call arrival state, then the selection means selects the second sound device as the telephone line connection destination, and changes the call state to a handset call state.

5. The call system according to claim 1, wherein
   if a disconnection button on the information terminal is depressed while the call state is a handsfree call state, then the selection means selects neither the first nor second sound devices as the telephone line connection destination, and changes the call state to a waiting state.

6. The call system according to claim 1, wherein
   if the handset is on hook while the call state is a handset call state, then the selection means selects neither the first nor second sound devices as the telephone line connection destination, and charges the call state to a waiting state.

7. The call system according to claim 1, wherein
   if the information terminal performs a calling operation while the call state is a waiting state, and a telephone set of a person on the other end of the telephone line is off hook, then the selection means selects the first sound device as the telephone line connection destination, and changes the call state to a handsfree call state.

8. The call system according to claim 1, wherein if the handset performs a calling operation while the call state is a waiting state, and a telephone set of a person on the other end of the telephone line is off hook, then the selection means selects the second sound device as the telephone line connection destination, and changes the call state to a handset call state.

9. The call system according to claim 1, wherein if the handset is off hook while the call state is a handsfree call state, then the selection means selects the second sound device as the telephone line connection destination, and changes the call state to a handset call state.

10. The call system according to claim 1, wherein if a call button on the information terminal is depressed while the call state is a handset call state, then the selection means selects the first sound device as the telephone line connection destination, and changes the call state to a handsfree state.

11. The call system according to claim 1, wherein the selection means selects both the first sound device and the second sound device as the connection destination on the receiving end of the telephone line so as to set, as the output destination of the sound, both the handsfree call loudspeaker and the handset call loudspeaker.

12. The call system according to claim 1, wherein the selection means selects both the first sound device and the second sound device as the connection destination on the transmitting end of the telephone line so as to set, as the input destination of the sound, both the handsfree call microphone and the handset call microphone.

13. The call system according to claim 1, further comprising:
addition means for adding up the sound input from the handset call microphone through the second sound device and the sound input from the connection destination on the receiving end of the telephone line, and for outputting an addition value to the handsfree call loudspeaker through the first sound device.

14. The call system according to claim 1, further comprising:
recording means for recording a call; and
addition means for adding up the sound input from the handset call microphone through the second sound device and the sound input from the connection destination on the receiving end of the telephone line, and for outputting an addition value to the recording means.

15. The call system according to claim 1, further comprising:
recording means for recording a call; and
addition means for adding up the sound input from the handsfree call microphone through the first sound device and the sound input from the connection destination on the receiving end of the telephone line, and for outputting an addition value to the recording means.

16. The call system according to claim 1, further comprising:
gain control means for adjusting a level of the sound to be transmitted to the connection destination on the transmitting end of the telephone line.

17. The call system according to claim 1, further comprising:
gain control means for adjusting a level of the sound transmitted from the connection destination on the receiving end of the telephone line.

18. The call system according to claim 1, further comprising:
gain control means for adjusting a level of the sound transmitted from the connection destination on the receiving end of the telephone line, in accordance with the level of the sound to be transmitted to the connection destination on the transmitting end of the telephone line in a voiceless sound period.

19. The call system according to claim 1, further comprising:
semi-duplex communication means for permitting outputting the sound to be transmitted to the connection destination on the transmitting end of the telephone line and prohibiting outputting the sound transmitted from the connection destination on the receiving end of the telephone line when the sound to be transmitted is present at the connection destination on the transmitting end of the telephone line, and for prohibiting outputting a voiceless sound to the connection destination on the transmitting end of the telephone line and permitting outputting the sound transmitted from the connection destination on the receiving end of the telephone line when no sound to be transmitted is present at the connection destination on the transmitting end of the telephone line.

20. The call system according to claim 1, further comprising:
gain control means for increasing a gain of the sound to be transmitted to the connection destination on the transmitting end of the telephone line and reducing a gain of the sound transmitted from the connection destination on the receiving end of the telephone line when the sound to be transmitted is present at the connection destination on the transmitting end of the telephone line, and for reducing the gain of the sound to be transmitted to the connection destination on the transmitting end of the telephone line and increasing the gain of the sound transmitted from the connection destination on the receiving end of the telephone line when no sound to be transmitted is present at the connection destination on the transmitting end of the telephone line.

21. The call system according to claim 1, further comprising:
a plurality of the handsets; and
connection means for connecting the plurality of handsets to different connection destinations, using a table that holds a correspondence between identification information on each of the plurality of handsets and the identification information on each of the different connection destinations.

* * * * *